(12) United States Patent
Champel

(10) Patent No.: US 12,101,453 B2
(45) Date of Patent: Sep. 24, 2024

(54) METHOD AND DEVICE FOR TRANSMITTING VIEWPOINT SWITCHING CAPABILITIES IN A VR360 APPLICATION

(71) Applicant: BEIJING XIAOMI MOBILE SOFTWARE CO., LTD., Beijing (CN)

(72) Inventor: Mary-Luc Georges Henry Champel, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 65 days.

(21) Appl. No.: 17/441,278

(22) PCT Filed: Mar. 20, 2019

(86) PCT No.: PCT/CN2019/078877
§ 371 (c)(1),
(2) Date: Sep. 20, 2021

(87) PCT Pub. No.: WO2020/186478
PCT Pub. Date: Sep. 24, 2020

(65) Prior Publication Data
US 2022/0150458 A1     May 12, 2022

(51) Int. Cl.
*H04N 13/117* (2018.01)
*H04N 13/106* (2018.01)
(Continued)

(52) U.S. Cl.
CPC ......... *H04N 13/117* (2018.05); *H04N 13/139* (2018.05); *H04N 13/158* (2018.05); *H04N 13/194* (2018.05)

(58) Field of Classification Search
CPC .. H04N 13/117; H04N 13/139; H04N 13/158; H04N 13/194; H04N 21/44218;
(Continued)

(56) References Cited

U.S. PATENT DOCUMENTS 9,848,212 B2    12/2017   Zhang et al.
10,974,147 B1*  4/2021    Sarria, Jr. ............... A63F 13/79
(Continued)

FOREIGN PATENT DOCUMENTS

CN    106791888 A    5/2017
CN    107615756 A    1/2018
(Continued)

OTHER PUBLICATIONS

International Search Report of PCT Application No. PCT/CN2019/078877 dated Dec. 19, 2019 with English translation, (6p).
(Continued)

*Primary Examiner* — Tung T Vo
(74) *Attorney, Agent, or Firm* — Arch & Lake LLP; Zhangyuan Ji; Hao Tan

(57) ABSTRACT

A method and a device for transmitting viewpoint switching capabilities in a Virtual Reality 360 (VR360) application are provided. The method for transmitting viewpoint switching capabilities in a VR360 application includes determining a configuration for switching between viewpoints in the VR360 application; and signaling the configuration to the VR360 application.

12 Claims, 8 Drawing Sheets

(51) Int. Cl.
*H04N 13/139* (2018.01)
*H04N 13/194* (2018.01)

(58) Field of Classification Search
CPC .. H04N 21/4728; H04N 21/816; H04N 5/268; H04N 21/8541; H04N 21/6587; H04N 21/658; H04N 21/2387; H04N 21/8173
USPC .......................................................... 348/51
See application file for complete search history.

(56) References Cited

U.S. PATENT DOCUMENTS

| | | | |
|---|---|---|---|
| 11,323,683 B2* | 5/2022 | Kammachi Sreedhar .................. | H04N 13/172 |
| 2014/0301297 A1* | 10/2014 | Geirhofer ............. | H04L 5/0053 370/329 |
| 2015/0185990 A1* | 7/2015 | Thompson ........... | G01C 21/367 715/800 |
| 2017/0013283 A1 | 1/2017 | Zhang et al. | |
| 2017/0244959 A1* | 8/2017 | Ranjeet .................. | G06T 7/292 |
| 2019/0141311 A1 | 5/2019 | Lee et al. | |
| 2019/0230388 A1* | 7/2019 | Di ...................... | H04N 21/2662 |
| 2019/0306530 A1* | 10/2019 | Fan .................. | H04N 21/85406 |
| 2019/0313081 A1* | 10/2019 | Oh .................... | H04S 21/21805 |
| 2019/0313199 A1* | 10/2019 | Laaksonen .............. | H04S 7/303 |
| 2019/0320156 A1* | 10/2019 | Oh ........................ | H04N 19/597 |
| 2020/0037029 A1* | 1/2020 | He ...................... | H04N 21/4728 |
| 2020/0092571 A1* | 3/2020 | Tourapis .................. | G09G 5/14 |
| 2020/0221063 A1* | 7/2020 | Kammachi Sreedhar .................. | H04N 21/85406 |
| 2020/0275156 A1* | 8/2020 | He ....................... | H04N 21/816 |
| 2020/0336803 A1* | 10/2020 | Fan .................... | H04N 21/8586 |
| 2021/0021806 A1* | 1/2021 | He ..................... | H04N 21/8456 |
| 2021/0160552 A1* | 5/2021 | Fang ................ | H04N 21/64322 |
| 2021/0183010 A1* | 6/2021 | Mate ................... | H04N 21/816 |

FOREIGN PATENT DOCUMENTS

| | | |
|---|---|---|
| CN | 107888939 A | 4/2018 |
| CN | 108702528 A | 10/2018 |
| CN | 109076255 A | 12/2018 |
| WO | 2017142353 A1 | 8/2017 |
| WO | 2018115572 A2 | 6/2018 |
| WO | 2018175855 A1 | 9/2018 |

OTHER PUBLICATIONS

Extended European Search Report issued to EP Application No. 19918523.2 dated Aug. 12, 2021, (8p).
Wang, Ye-Kui, "WD 4 of ISO/IEC 23090-2 OMAF 2nd edition" (Systems), ISO/IEC JTC1/SC29/WG11 N18227-v1, Marrakech, MA, Jan. 2019, (226p).
Igor, D.D., "[OMAF] Switching Viewpoints with Different Timelines" (Nokia), ISO/IEC JTC1/SC29/WG11 MPEG2019/M46461, Marrakech, Morocco, Jan. 2019 (4p).
Oh, Sejin, "[OMAF] Signalling of Transition Effect of Viewpoints" (LG Electronics), ISO/IEC JTC1/SC29/WG11 MPEG2017/m43400, Ljubljana, Slovenia, Jul. 2018, (3p).
Champel, Mary-Luc, "[OMAF] Multiviewpoint Switching Transitions", (Technicolor), ISO/IEC JTC1/SC29/WG11 MPEG2017/m43572, Ljubljana, Slovenia, Jul. 2018, (3p).
Champel, Mary-Luc, "[OMAF] Multiviewpoint Switching Transitions", (Xiaomi), ISO/IEC JTC1/SC29/WG11 MPEG2017/m47385, Geneva, CH, Mar. 2019, (6p).
Patent Office of the Russian Federation, Federal Institute of Industrial Property Office Action Issued in Application No. 2021130009/07(063630) May 4, 2022, (11p).
3rd Generation Partnership Project; Technical Specification Group Services and System Aspects; QoE parameters and metrics relevant to the Virtual Reality user experience (Release 16), 3GPP TR 26.929 V0.7.0 (Jan. 2019), (31p).
JPOA issued in Application No. 2021-556304, dated Oct. 25, 2022, with English translation,(12p).

* cited by examiner

METHOD AND DEVICE FOR TRANSMITTING VIEWPOINT SWITCHING CAPABILITIES IN A VR360 APPLICATION

CROSS-REFERENCE TO RELATED APPLICATIONS

This application is the U.S. national phase application of International Application No. PCT/CN2019/078877, filed on Mar. 20, 2019, the entire contents of which are incorporated herein by reference for all purposes.

FIELD OF THE INVENTION

The present disclosure relates to Virtual Reality 360 (VR360) technologies and more particularly, to a method and device for transmitting viewpoint switching capabilities in a VR360 application.

BACKGROUND

OMAF (Omnidirectional MediA Format) defines a media format that enables omnidirectional media applications, focusing on 360° video, images, and audio, as well as associated timed text. What is specified in OMAF includes (but is not limited to):
1). A coordinate system that consists of a unit sphere and three dimensions;
2). Projecting and rectangular region-wise packing methods that may be used for conversion of a spherical video sequence or image into a two-dimensional rectangular video sequence or image, respectively,
3). Storage of omnidirectional media and the associated metadata using an ISO Base Media File Format (ISOBMFF) as specified in ISO/IEC 14496-12,
4). Encapsulating, signaling, and streaming of omnidirectional media in a media streaming system, e.g., dynamic adaptive streaming over HTTP (DASH) as specified in ISO/IEC 23009-1 or MPEG media transport (MMT) as specified in ISO/IEC23008-1, and
5). Media profiles and presentation profiles that provide interoperable and conformance points for media codecs as well as media coding and encapsulation configurations that may be used for compression, streaming, and playback of the omnidirectional media content.

One of the most popular forms of omnidirectional media applications is omnidirectional video, also known as 360° video. Omnidirectional video is typically captured by multiple cameras that cover up to 360° of the scene. Compared to traditional media application formats, the end-to-end technology for omnidirectional video (from capture to playback) is more easily fragmented due to various capturing and video projection technologies. From the capture side, there exist many different types of cameras capable of capturing 360° video, and on the playback side there are many different devices that are able to playback 360° video with different processing capabilities.

To avoid fragmentation of omnidirectional media content and devices, a standardized format for omnidirectional media applications is specified in OMAF standard ISO/IEC 23090-2 (MPEG-I part2).

When omnidirectional media content is consumed with an OMAF player, such as head-mounted display and headphones, only the parts of the media that correspond to the user's viewing orientation are rendered, as if the user were in the spot where and when the media was captured.

FIG. 1 schematically illustrates a VR360 application that happens in a scenario with 3 rooms: room A, B and C. For each room, the user can play an omnidirectional video whose viewpoint are illustrated in the FIG. 1. For each room, the viewpoint (viewpoint A, viewpoint B, and viewpoint C in the FIG. 1) is the center of the sphere from which the 360° video is rendered. This can be understood as the user position.

For each viewpoint, a recommended viewport/default viewport is pre-defined, respectively. As illustrates in FIG. 1, the recommended viewport/default viewport is viewport A, viewport B, and viewport C, respectively.

The viewport is a portion of the VR360 video. For instance visible viewport is the portion of the VR360 video actually seen by a user at a point. For visible viewport, this can be understood as the user viewing orientation.

Currently, switching between the viewpoints in a single OMAF application is not supported in MPEG-I.

SUMMARY

The present disclosure proposes a solution for switching between viewpoints within a single VR360 application.

According to a first aspect of the present disclosure, a method for transmitting viewpoint switching capabilities in a VR360 application is provided. The method includes determining a configuration for switching between viewpoints in a VR360 application and signaling the configuration to the VR360 application.

According to a second aspect of the present disclosure, a method transmitting viewpoint switching capabilities in a VR360 application is provided. The method includes obtaining a configuration for switching between viewpoints in a VR360 application and switching between viewpoints in the VR360 application according to the configuration.

According to a third aspect of the present disclosure, a device for transmitting viewpoint switching capabilities in a VR360 application is provided. The device includes at least one memory storing instructions and at least one processor configured to execute the instructions to determine a configuration for switching between viewpoints in the VR360 application and signal the configuration to the VR360 application.

According to a fourth aspect of the present disclosure, a device for transmitting viewpoint switching capabilities in a VR360 application. The device includes at least one memory storing instructions and at least one processor configured to obtain a configuration for switching between viewpoints in the VR360 application and switch between viewpoints in the VR360 application according to the configuration.

According to a fifth aspect of the present disclosure, there is provided a computer-readable storage medium having stored therein at least one instruction which is loaded and executed by a processor to determine a configuration for switching between viewpoints in the VR360 application and signal the configuration to the VR360 application.

According to a sixth aspect of the present disclosure, there is provided a computer-readable storage medium having stored therein at least one instruction which is loaded and executed by a processor to obtain a configuration for switching between viewpoints in the VR360 application and switch between viewpoints in the VR360 application according to the configuration.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in details below, with reference to the accompanying drawings, where FIG. 1 schematically illustrates an example for multiple viewpoints and multiple viewports within a scenario.

DETAILED DESCRIPTION

Figure 1:
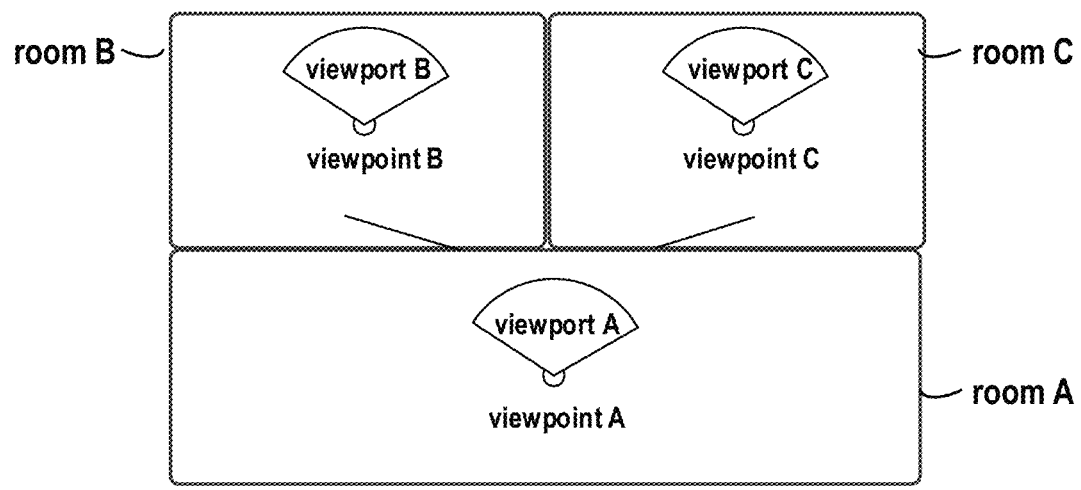

The subject matter described herein will now be discussed with reference to several exemplary embodiments. It should be understood these embodiments are discussed only for the purpose of enabling those persons skilled in the art to better understand thus implement the subject matter described herein, rather than suggesting any limitations on the scope of the subject matter.

The terminology used herein is for the purpose of describing particular embodiments only and is not intended to be a limit to exemplary embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the Figures. For example, two functions or acts shown in succession may in fact be executed concurrently or may sometimes be executed in the reverse order, depending upon the functionality/acts involved.

Embodiments of the present disclosure may be applied in various devices and/or systems. Given the rapid development, there will of course also be future type technologies, systems, and devices with which the present disclosure may be embodied. It should not be seen as limiting the scope of the present disclosure to only the aforementioned devices and/or systems.

As used herein, the term "VR360 player" refers to a device which could playback VR360 media, such as head-mounted display, headphones and so on. The VR360 media is an omnidirectional video streaming, also called 360° video, omnidirectional media, or omnidirectional media video. In some embodiments of the disclosure, the VR360 media may be an OMAF media. In some embodiments of the disclosure, the VR360 play may be an OMAF player. The term "VR360 application" refers to an application including at least one viewpoint, and the VR360 player could switch between the viewpoints, for instance the VR360 player could switch from one viewpoint (called source viewpoint) to another viewpoint (called destination viewpoint). The skilled person should understand that the VR360 application may be produced by any necessary device, and play back by any necessary device, like a VR360 player or an OMAF player.

As used herein, the term "viewpoint switching" refers to a VR360 player switches from a source viewpoint to a destination viewpoint in a VR360 application.

In some embodiments of the disclosure, following ISOBMFF structures are defined:
ViewpointPosStruct( ) which defines the position of the viewpoint in the global coordinate system, possibly with GPS information as well,
ViewpointGlobalCoordinateSysRotationStruct( ) which defines the orientation of the viewpoint in the global coordinate system,
ViewpointGroupStruct( ) which allows grouping viewpoints together, and
ViewpointEntry( ) which defines a viewpoint_id unique for each viewpoint.

In order to describe all possible transitions between viewpoints, the present disclosure proposes a new configuration associated to at least one viewpoint or switching from which a transition exists. Thus, it becomes possible to describe every possible path in the storyline of the VR360 application. In some embodiments of the disclosure, the configuration may be an additional ISOBMFF structure associated to a viewpoint or a switching transition.

Now some exemplary embodiments of the present disclosure will be described below with reference to the following Figures.

Figure 2:
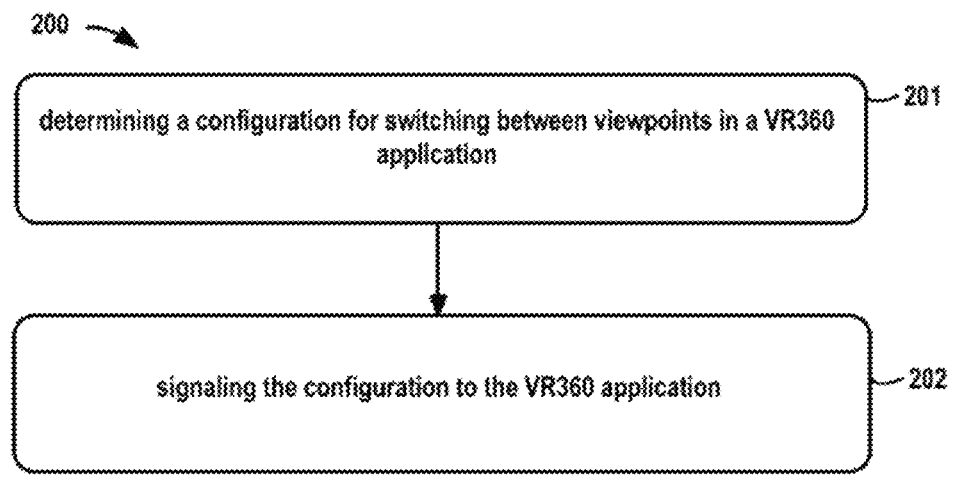
FIG. 2 schematically illustrates a flow chart of a method 200 according to embodiments of the present disclosure.

FIG. 2 illustrates a flow chart of a method 200 according to embodiments of the present disclosure. The method 200 may be implemented by a device for producing a VR360 application or any device like.

At 201, determining a configuration for switching between viewpoints in a VR360 application; and At 202, signaling the configuration to the VR360 application.

In some embodiments, the configuration is implemented by at least one box which is attached to a viewpoint or a switching transition. In some embodiments, if the configuration is implemented by several boxes, some of the boxes may be attached to viewpoint(s), and some of the boxes may be attached to switching transition(s).

In some embodiments, the box may be an ISOBMFF box or any format like. The skilled person understands that the configuration could be implemented by any suitable format.

In some embodiments, the configuration comprises any or any combination of parameters in a group of:
a viewport parameter indicating an initial viewport for a specific viewpoint switching, a transition effect parameter indicating a specific transition effect for a specific viewpoint switching,
an activation window parameter indicating at least one activation window for a viewpoint switching, and
a time switching parameter indicating a start position of playout timeline in the destination media time during a specific viewpoint switching.

In some embodiments, the four parameters may be configured alone or in combination. In some embodiments, any one of the parameters or the combination of the parameters here above may be implemented by one box or several boxes.

In some embodiments, the viewport parameter indicates information of initial viewport for a specific viewpoint switching transition. In some embodiments, if the viewport parameter is present, a specific initial viewport shall be used after a viewpoint switching transition. Otherwise, a recommended viewport or default viewport shall be used.

In some embodiments, the transition effect parameter indicates information of an effect media to be played during the viewpoint switching transition. The effect video may be a video or actual known transformations, such as fade-to-black, mirror effect, fly over, and so on. In some embodiments, the transformations may be identified by an ID in a pre-defined list, or it can also be a URL, or an ISOBMFF track_id which points to an external or an internal video stream meant to be played at the time of the viewpoint switching transition. In some embodiments, if the transition effect parameter is present, the VR360 player shall play a specific transition effect according the transition effect parameter during a specific viewpoint switching transition. Otherwise, the VR360 player plays the VR360 media associated to the destination viewpoint immediately without any transition effect.

In some embodiments, the activation window parameter indicates at least one activation window relative to the current viewpoint media timeline during which the transition is activated. In some embodiments, if the activation window parameter is present, the VR360 player may switch to a destination viewpoint only within the activation window. Otherwise, the VR360 player may switch to a destination viewpoint at any time in the timeline.

In some embodiments, the time switching parameter indicates where to play in timeline of the VR360 media associated to destination viewpoint after the viewpoint switching transition. In some embodiments, if an offset is present, the playout of the VR360 media may start with the offset when a VR360 player switches to the destination viewpoint. Otherwise, the playout of the VR360 media may start with an absolute position $t_0$ or a relative position $t_{curr}$ in the timeline of the VR360 media associated to destination viewpoint. In some embodiments, absolute position $t_0$ is the beginning of destination viewpoint media timeline, the relative position $t_{curr}$ is the current time in the destination viewpoint media timeline. The word "current time" refers to the time that the viewpoint switching transition is activated.

In some embodiments, the time switching parameter comprises at least one of the following parameters:
a timeline-switching-offset flag indicating whether a time offset is present;
an offset indicator indicating the value of the offset, and
a relative-to-current flag indicating information about starting point from which the offset is provided.

In some embodiments, the absolute offset means that the offset is an offset relative to beginning of the viewpoint media timeline, and the relative offset means that the offset is an offset relative to the current time of the viewpoint media timeline.

In some embodiments, if the timeline-switching-offset flag=0 and the relative-to-current flag=0, after the switching transition, the viewpoint media associated to destination viewpoint starts at time $t_0$, the beginning in this viewpoint media timeline. If the timeline-switching-offset flag=0 and the relative-to-current flag=1, after the switching transition, the viewpoint media associated to destination viewpoint starts at time $t_{curr}$, the current time in this viewpoint media timeline. The word "current time" refers to the time that the viewpoint switching transition is activated. If the timeline-switching-offset flag=1 and the relative-to-current flag=0, after the switching transition, the viewpoint media associated to destination viewpoint starts at time $t_0$+offset. If the timeline-switching-offset flag=1 and the relative-to-current flag=1, after the switching transition, the viewpoint media associated to destination viewpoint starts at time $t_{curr}$+offset.

Figure 3A:
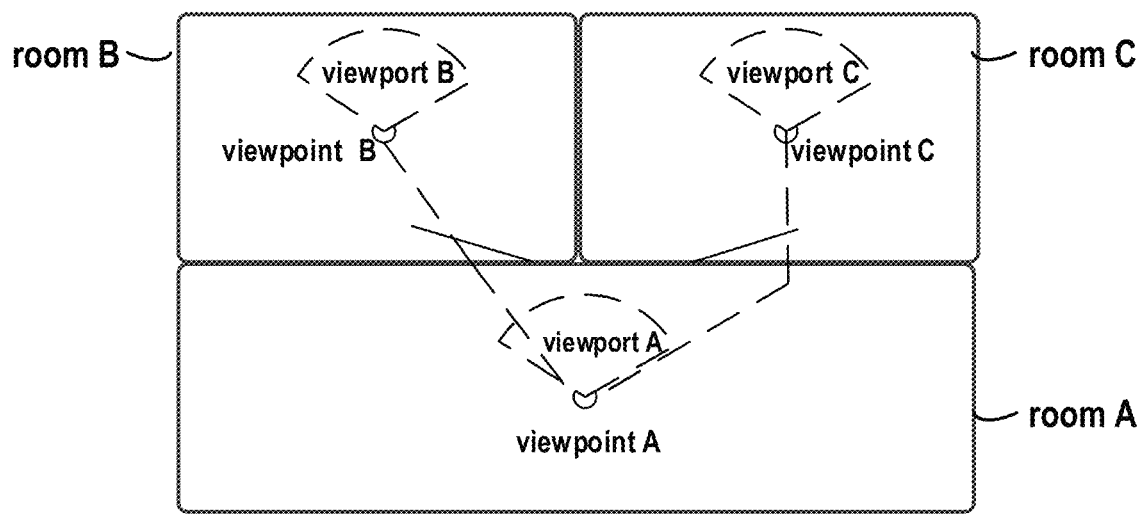
FIG. 3A to FIG. 3F schematically illustrate exemplary activation window for switching between viewpoints.

FIG. 3A schematically illustrates a VR360 application that happens in a scenario with 3 rooms: room A, B and C. The user can play a VR360 media whose viewpoints and viewports are illustrated in the FIG. 3A. According to some embodiments, three ISOBMFF boxes are attached to the three viewpoints, respectively. Or four ISOBMFF boxes are attached to the four possible switching transitions, respectively. The four possible transitions are: switching from viewpoint A to viewpoint B, switching from viewpoint B to viewpoint A, switching from viewpoint A to viewpoint C, and switching from viewpoint C to viewpoint A. The skilled person understands that the ISOBMFF box could be attached in only some of the viewpoints, or only some of the possible viewpoint switching transitions, or some of the ISOBMFF boxes are attached to viewports and some of the ISOBMFF boxes are attached to switching transitions.

In some embodiments, the viewport parameter comprises:
a viewport flag indicating whether the initial viewport for the destination viewpoint is present.

In some embodiments, the viewport flag indicates whether the initial viewport for the destination viewpoint is present. When the initial viewport is present, the VR360 player plays VR360 media associated to the viewpoint at the provided initial viewport after the viewpoint switching transition. In some embodiments, when the initial viewport is not present, the VR360 player plays VR360 media associated to a recommended viewport or a default viewport after the viewpoint switching transition.

FIG. 3A schematically illustrates the recommended viewport/default viewport for the three viewpoints: viewpoint A, viewpoint B, and viewpoint C, respectively. In some embodiments, the initial viewport may be same as the recommended viewport/default viewport, or different from the recommended viewport/default viewport.

FIG. 3B, FIG. 3C, FIG. 3D, FIG. 3E, and FIG. 3F schematically illustrate a VR360 application according to some embodiments of the disclosure.

Figure 3B:
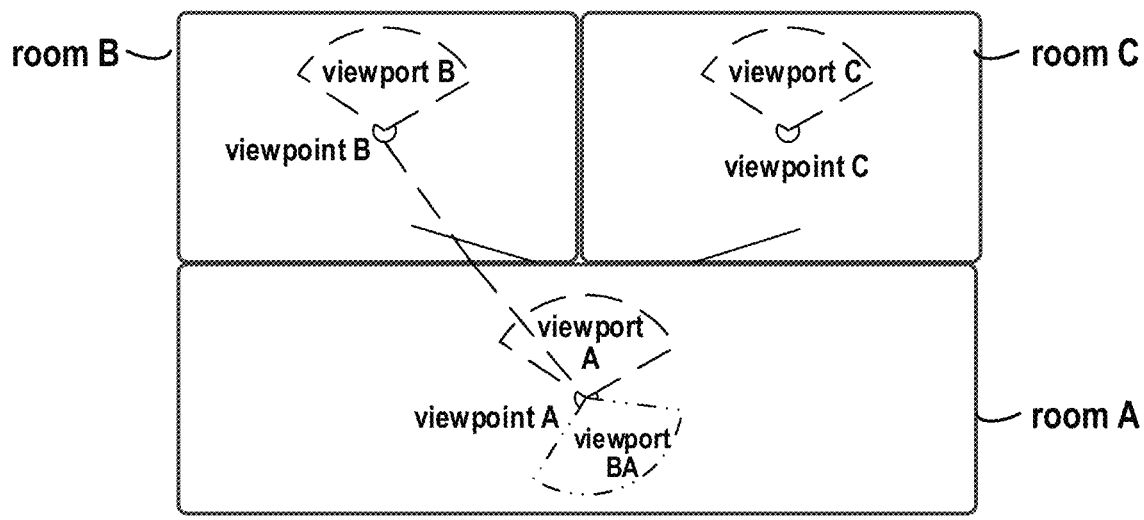

In some embodiments as shown in FIG. 3B, if the initial viewport is not present, when a user switches from viewpoint B to viewpoint A, the user's viewport in viewpoint A is the recommended viewport/default viewport, the viewport A. But in a real scenario, the viewing orientation of the user is the direction of viewport BA shown in FIG. 3b. In some embodiments of the disclosure, an initial viewport, viewport BA, is pre-defined for switching from viewpoint B to viewpoint A. If the initial viewport for the transition from viewpoint B to viewpoint A is present by the viewport flag, the initial viewport BA gives the user a same point of view as if the user was walking through the door between room B and A.

Figure 3C:
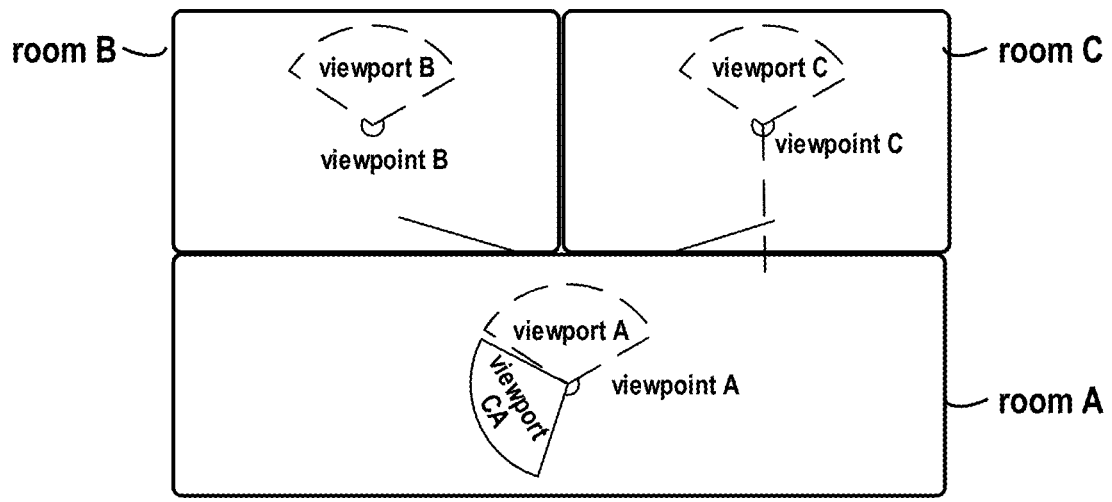

In some embodiments as shown in FIG. 3C, if the initial viewport is not present, when a user switches from viewpoint C to viewpoint A, the user's viewport in viewpoint A is the recommended viewport/default viewport, the viewport A. But in a real scenario, the viewing orientation of the user is the direction of viewport CA shown in FIG. 3c. In some embodiments of the disclosure, an initial viewport, viewport CA, is pre-defined for switching from viewpoint C to viewpoint A. If the initial viewport for the transition from viewpoint C to viewpoint A is present by the viewport flag, the initial viewport CA gives the user a same point of view as if the user was walking through the door between room C and A.

Figure 3D:
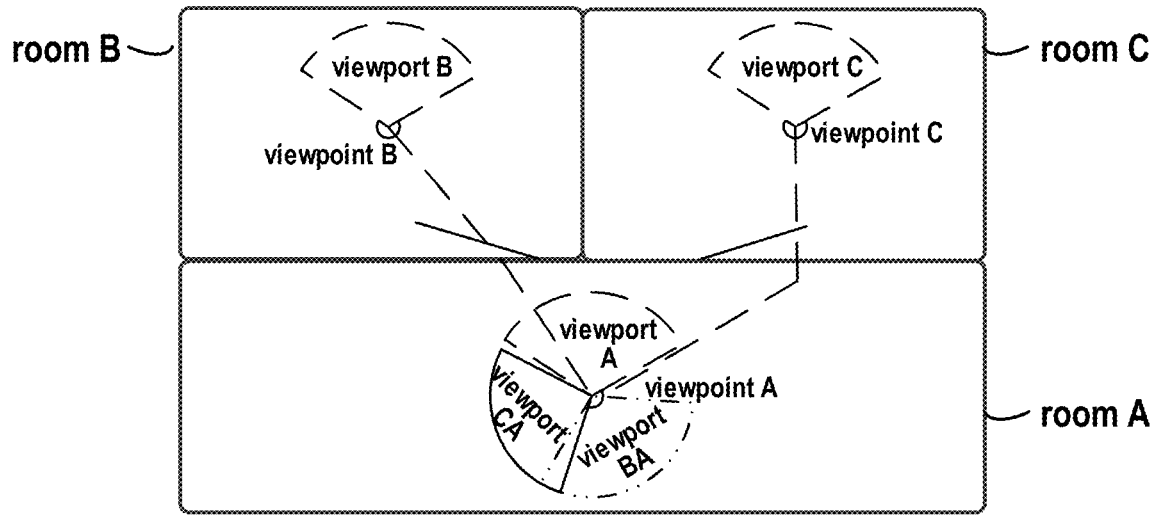

In some embodiments as shown in FIG. 3D, both the two initial viewports, viewport BA and viewport CA, are pre-defined. In some embodiments of the disclosure, both the two initial viewports are attached in the viewpoint A, or attached in the two viewpoint switching transitions, respectively. The skilled person understands that in some embodiments, only one of the initial viewports is pre-defined in some embodiments as shown in FIG. 3B or FIG. 3C.

Referring to FIG. 3D, different switching may correspond to different initial viewport, for instance, switching from viewpoint B to viewpoint A corresponds to viewport BA associated to viewpoint A, and switching from viewpoint C to viewpoint A corresponds to viewport CA associated to viewpoint A.

Figure 3E:
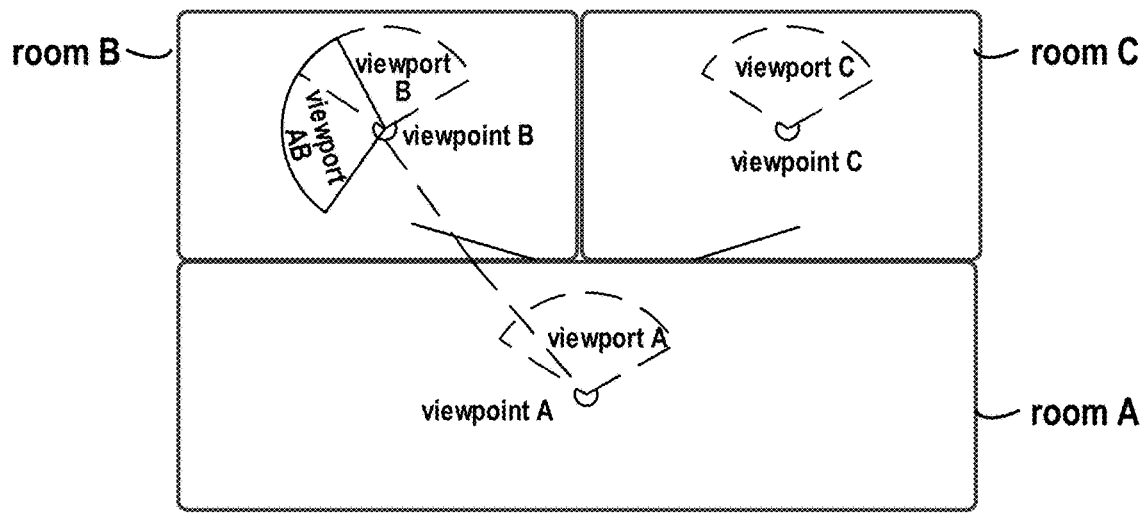

In some embodiments as shown in FIG. 3E, if the initial viewport is not present, when a user switches from viewpoint A to viewpoint B, the user's viewport in viewpoint B is the recommended viewport/default viewport, the viewport B. But in a real scenario, the viewing orientation of the user is the direction of viewport AB shown in FIG. 3e. In some embodiments of the disclosure, an initial viewport, viewport AB, is pre-defined for the switching from viewpoint A to viewpoint B. If the initial viewport for the transition from viewpoint A to viewpoint B is present by the viewport flag, the initial viewport AB gives the user a same point of view as if the user was walking through the door between room B and A.

Figure 3F:
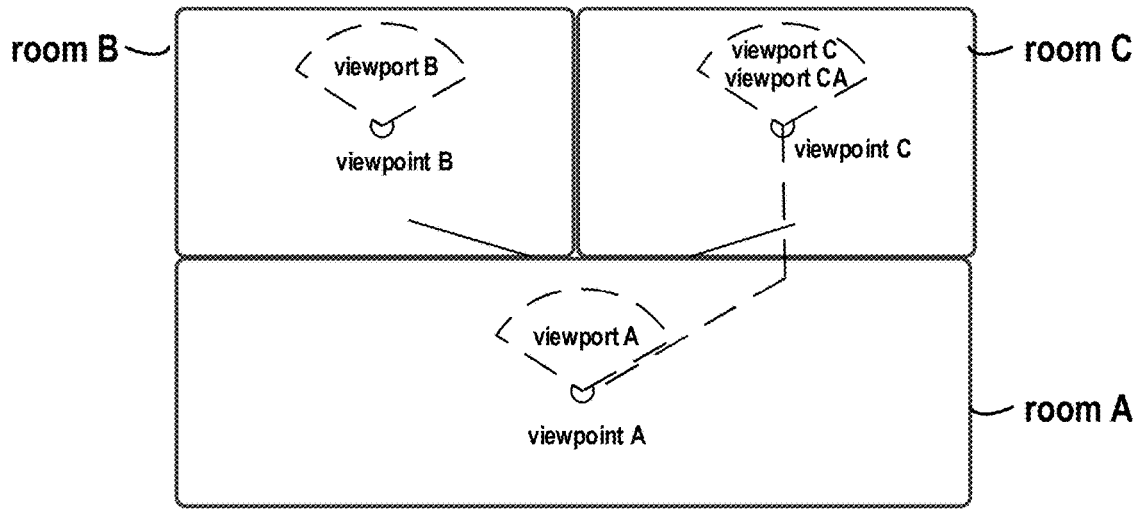

In some embodiments as shown in FIG. 3F, when a user switches from viewpoint A to viewpoint C, the user's viewport in viewpoint C is the recommended viewport/default viewport, the viewport C. In this embodiment, the initial viewport for the switching is same as the recommended viewport/default viewport. In some embodiments, if the user's real viewing orientation is different from the recommended viewport/default viewport, an initial viewport same as the real viewing orientation shall be pre-defined.

The skilled person understands that in some embodiments, an initial viewport can be pre-defined according to the real viewing orientation.

According to the embodiments here above, the skilled person understands that the initial viewports for each transition associated to a single viewpoint may different. For example, the viewport BA and viewport CA.

In some embodiments, the configuration further comprises a switching possibility parameter indicating multiple switching possibilities with at most one viewport per switching possibility, wherein the switching possibility parameter may comprise at least one of the following parameters:
 a number parameter indicating the number of possible viewpoint switching, and
 for each possible viewpoint switching, an ID parameter indicating ID of a destination viewpoint and a transition associated to it.

In some embodiments, each viewpoint has a viewpoint_id specified by a ISOBMFF structure, e.g. ViewpointEntry( ) The viewpoint_id identifies a viewpoint. The ID parameter indicates viewpoint_id of possible destination viewpoint. The number parameter indicates the number of possible viewpoint switching for current viewpoint.

In some embodiments, the transition effect parameter comprises at least one of the following parameters:
 a transition effect flag indicating whether a transition effect is present,
 a transition effect type flag indicating the type of transition effect for a specific switching, and
 a transition effect indicator indicating the position where a specific transition effect video is stored.

In some embodiments, the transition effect can be a pre-defined video or audio, or any suitable media to be played when rendering the switching transition.

In some embodiments, the transition effect type may be a video, or actual known transformations, such as fade-to-black, mirror effect, fly over, and so on. The transition effect is indicated by the transition effect type flag.

In some embodiments, the transition effect indicator comprises a track_id which corresponds to a media to be played when rendering the switching transition. The track_id identifies the media to be played at the time of transition. In some embodiments, the media is stored in the VR360 content. In some embodiments, the transition effect indicator comprises an URL (Uniform Resource Locator) of the media to be played when rendering the switching transition. The skilled person understands that the transition effect indicator may comprise track_id, URL, or any existing technologies to address the media.

In some embodiments, the activation window parameter comprises at least one of the following parameters:
 a minimum time flag indicating whether a minimum time for a switching transition is present; if the minimum time is present, the transition can only be activated after the minimum time,
 a minimum time parameter indicating value of the minimum time,
 a maximum time flag indicating whether a maximum time for a switching transition is present, if the maximum time is present, the transition can only be activated before the maximum time, and
 a maximum time parameter indicating value of the maximum time.

In some embodiments, the activation window parameter is a parameter relative to the current viewpoint media timeline during which the transition is activated. In some embodiments, a switching transition can be activated at any time during the current viewpoint media timeline.

Figure 4A:
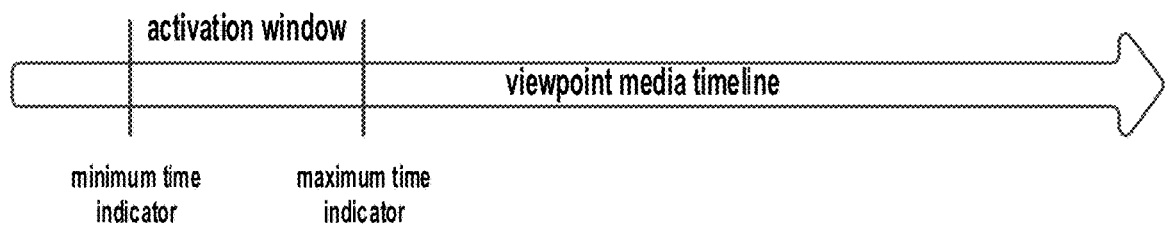
FIG. 4A to FIG. 4D schematically illustrate exemplary viewport for switching between viewpoints.
Figure 4B:
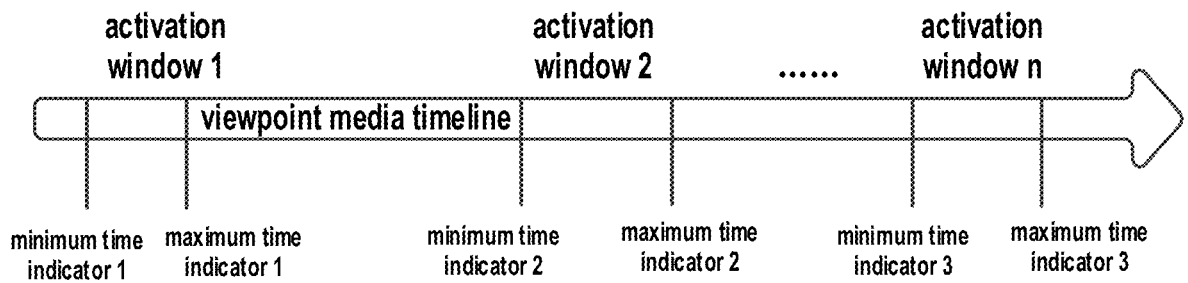

FIGS. 4A-4D show the embodiments of the disclosure. In FIG. 4A, both the minimum time flag and the maximum time flag are set. The minimum time and the maximum time in the viewpoint media timeline specify an activation window for a viewpoint switching. In some embodiments, one activation window is pre-defined during the current viewpoint media timeline as shown in FIG. 4A. In some embodiments, by using ViewpointSwitchingStruct( ) in the timed metadata track, several activation windows are pre-defined during the current viewpoint media timeline as shown in FIG. 4B.

Figure 4C:
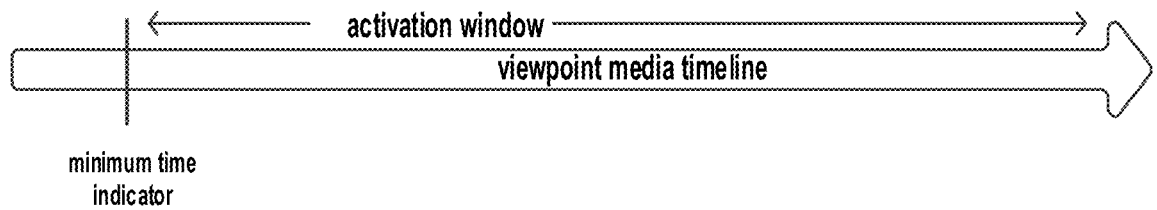

In some embodiments, only the minimum time in the viewpoint media timeline is set, and the maximum time is not set, as shown in FIG. 4C. It means that only the start position of the activation window is pre-defined by the minimum time parameter, and the end position is not limited. In other words, the activation window starts at the minimum time and ends at the end of the viewpoint media timeline.

Figure 4D:
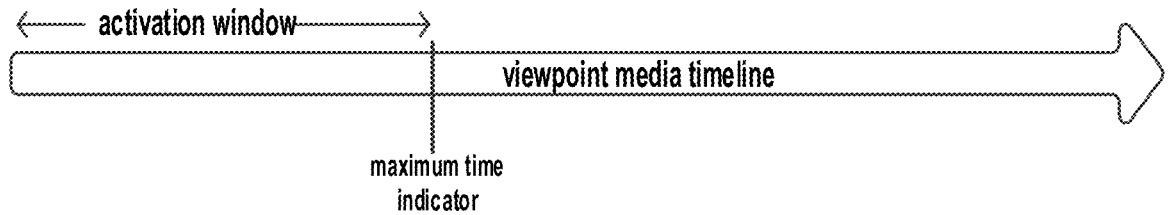

In some embodiments, only the maximum time in the viewpoint media timeline is set, and the minimum time is not set, as shown in FIG. 4D. It means that only the end position of the activation window is pre-defined by the maximum time parameter, and the start position is not limited. In other words, the activation window starts at the beginning of the viewpoint media timeline and ends at the maximum time.

In some embodiments, the time switching parameter comprises at least one of the following parameters:
  a timeline-switching-offset flag indicating whether a time offset is present;
  an offset indicator indicating the value of the offset, and
  a relative-to-current flag indicating information about starting point from which the offset is provided.

In some embodiments, the absolute offset means that the offset is an offset relative to beginning of the viewpoint media timeline, and the relative offset means that the offset is an offset relative to the current time of the viewpoint media timeline.

In some embodiments, if the timeline-switching-offset flag=0 and the relative-to-current flag=0, after the switching transition, the viewpoint media associated to destination viewpoint starts at time $t_0$, the beginning in this viewpoint media timeline. If the timeline-switching-offset flag=0 and the relative-to-current flag=1, after the switching transition, the viewpoint media associated to destination viewpoint starts at time $t_{curr}$, the current time in this viewpoint media timeline. The word "current time" refers to the time that the viewpoint switching transition is activated. If the timeline-switching-offset flag=1 and the relative-to-current flag=0, after the switching transition, the viewpoint media associated to destination viewpoint starts at time $t_0$+offset. If the timeline-switching-offset flag=1 and the relative-to-current flag=1, after the switching transition, the viewpoint media associated to destination viewpoint starts at time $t_{curr}$+offset.

Figure 5:
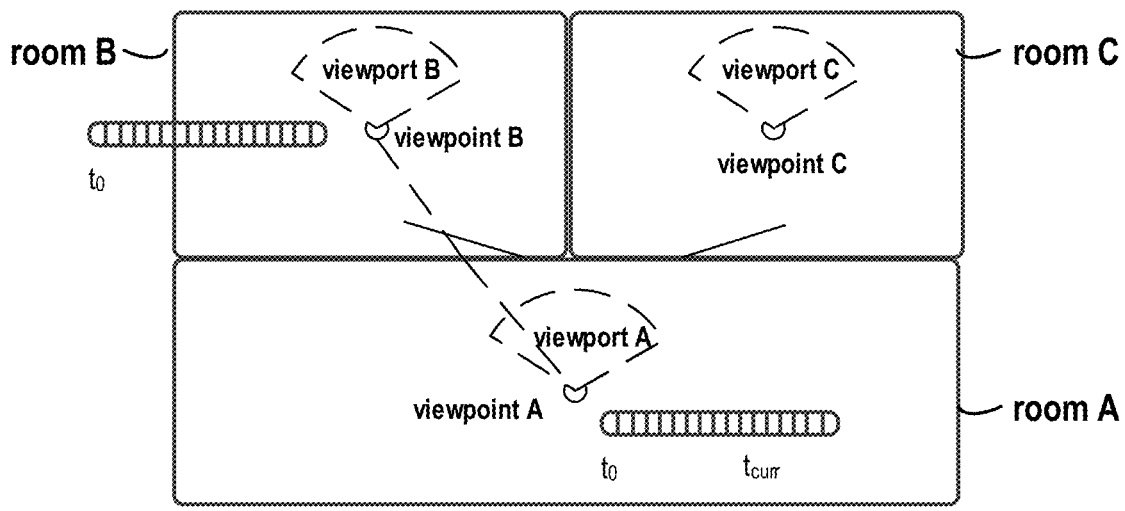
FIG. 5 schematically illustrate exemplary playout time during the switching transition.

FIG. 5 schematically illustrates some embodiments of a VR360 application of the disclosure. The user with a VR360 player starts in room A with a viewport A allowing the user to see doors, the VR360 media associated to the viewpoint A starts at time $t_0$ at the beginning of the VR360 media timeline. When the user enters room B from room A at time $t_0$, the transitions to viewpoint B and its initial viewport gives the user a same point of view as if he was walking through the door between room A and B. The VR360 media associated to viewpoint B also starts at time $t_0$ of the viewpoint media timeline.

When the user moves back to room A from room B at time $t_{curr}$, the transitions back to viewpoint A and its initial viewport gives the user a same point of view as if the user was walking through the door between room A and B. At that time, the viewpoint media associated to viewpoint A continues from current time ($t_{curr}$) plus playout of the transition effect video. The media associated to viewpoint A continues from time $t_0$+offset when the offset is an absolute offset, or from time $t_{curr}$+offset when the offset is a relative offset.

Moreover, the present technical disclosure proposes to fill this new Viewpoint transition structure with elements that are characteristics of the transition. This includes:
  transition effect to be used at the actual playout of the transition by the user; such transition effects may be actual known transformations (such as fade-to-black, mirror effect, fly over, . . . ) identified by an id in a pre-defined list (what is out of scope of this disclosure since there is a lot of prior art to choose from here) or it can also be a URL or an ISOBMFF track_id which points to an external or an internal video stream meant to be played at the time of the transition.
  A time window relative to the current viewpoint media timeline during which the transition is activated.
  information about where to switch in time in the timeline of the media associated to the destination viewpoint.
  information about where to switch in space (viewport) in the media associated to the destination viewpoint.

The following ISOBMFF grammar is a possible embodiment of the present disclosure:

```
aligned(8) class ViewpointSwitchingStruct ( ) {
    unsigned int(8) num_viewpoint_switching;
    for (i = 0; i < num_viewpoint_switching; i++) {
        unsigned int(16) destination_viewpoint_id;
        ViewpointSwitchingTransition( ) ;
    }
}
aligned(8) class ViewpointSwitchingTransition( ) {
    unsigned int(1) transition_effect_flag;
    unsigned int(1) timeline_switching_offset_flag;
    unsigned int(1) relative_to_current_flag;
    unsigned int(1) destination_viewport_flag;
    unsigned int(1) min_time_flag;
    unsigned int(1) max_time_flag;
    bit(2) reserved = 0;
    // type of transition effect
    if (transition_effect_flag) {
        unsigned int(8) transition_effect_type[i];
        if (i==4) { unsigned int(32) transition_video_track_id; }
        if (i==5) { unsigned int(32) transition_video_URL; }
    }
    // where to switch in timeline of media associated to destination viewpoint
    if (timeline_switching_offset_flag) {
        signed int (32) t_offset;
    }
    // which viewport to switch to in the destination viewpoint
    if (destination_viewport_flag) {
        SphereRegionConfigBox( ); // definition of the destination viewport as a
        sphere region
```

```
}
// time window for activation of the switching
if (min_time_flag) { signed int (32) t_min; }
if (max_time_flag) { signed int (32) t_max; }
}
```

The following semantics are associated to the possible ISOBMFF grammar embodiment defined here before:

TABLE 1

Semantics of the possible ISOBMFF grammar

| | |
|---|---|
| transition_effect_flag | equal to 1 specifies that a transition effect description is present. |
| transition_effect_type | indicates the type of transition effects, as listed in Table 2, when switching to this viewpoint. |
| transition_video_track_id | indicates the track_id of the video to be played when rendering the transition. |
| transition_video_URL | indicates the URL of the video to be played when rendering the transition. |
| timeline_switching_offset_flag | equal to 1 specifies that a time offset is present |
| relative_to_current_flag | equal to 0 specifies that the media associated to the destination viewpoint is played from its beginning at $t_0$. If a time offset is present, the media is played from $t_0 + t\_offset$. equal to 1 specifies that the media associated to the destination viewpoint is played from the current position in time $t_{curr}$. If a time offset is present, the media is played from $t_{curr} + t\_offset$.. |
| t_offset | specifies the time offset to be used when switching. |
| min_time_flag | equal to 1 specifies that a minimum time with regard to s to the current viewport media timeline is present. If present, the transition can only be activated after this minimum playout time. |
| max_time_flag | equal to 1 specifies that a maximum time with regards to the current viewport media timeline is present. If present, the transition can only be activated before this maximum playout time. |
| t_min | specifies the minimum playout time of the current viewport media timeline after which the switching can be activated. |
| t_max | specifies the maximum playout time of the current viewport media timeline before which the switching can be activated. |
| num_viewpoint_switching | indicates the number of switching transitions possible from the viewpoint to which the ViewpointSwitchingStruct is associated |
| destination_viewpoint_id | indicates the viewpoint_id of the destination viewpoint of a viewpoint switching. |
| destination_viewport_flag | equal to 1 specifies that a specific viewport shall be used after transitioning to the new viewpoint, equal to 0 specifies default OMAF viewport switching process shall be used (recommended viewport if present, or default viewport otherwise). |

TABLE 2

Transition effect type

| Value | Description |
|---|---|
| 0 | Zoom-in effect |
| 1 | Walk though effect |
| 2 | Fade-to-black effect |
| 3 | Mirror effect |
| 4 | Video transition (track_id) |
| 5 | Video transition (URL) |
| 6-127 | Reserved for future extension |

The skilled person understands that some embodiments of the disclosure can be implemented, but not limited to, by the ISOBMFF grammar here above. And the value of the parameters here above is only an example.

Comparing with the current Working Draft of OMAF (Working Draft W18227), the above ISOBMFF box of some embodiments of the disclosure defines viewpoints thanks to the following new ISOBMFF structures:

ViewpointSwitchingStruct( ) which defines number of switching transitions possible from the viewpoint, viewpoint_id of the destination viewpoint of a viewpoint switching, and the switching characteristics of switching transition.

In some embodiments of the disclosure, the switching activation time window mechanism offered in the ViewpointSwitchingStruct box only allows for one minimum time and one maximum time. In order to support multiple activation windows during the playout time of the current viewpoint media, the present disclosure proposes to add a ViewpointSwitchingStruct box in the time metadata track for dynamic viewpoint information.

In some embodiments of the disclosure,
the viewport parameter comprises: destination_viewport_flag;
the multiple switching possibilities with at most one viewport per switching possibility parameter comprises: num_viewpoint_switching, and destination_viewpoint_id;
the transition effect parameter comprises: transition_effect_flag, transition_effect_type, transition_video_track_id, and transition_video_URL;
the time switching parameter comprises: timeline_switching_offset_flag, relative_to_current_flag, and t_offset; and
the activation window parameter comprises: min_time_flag, max_time_flag, t_min, and t_max.

Figure 6:
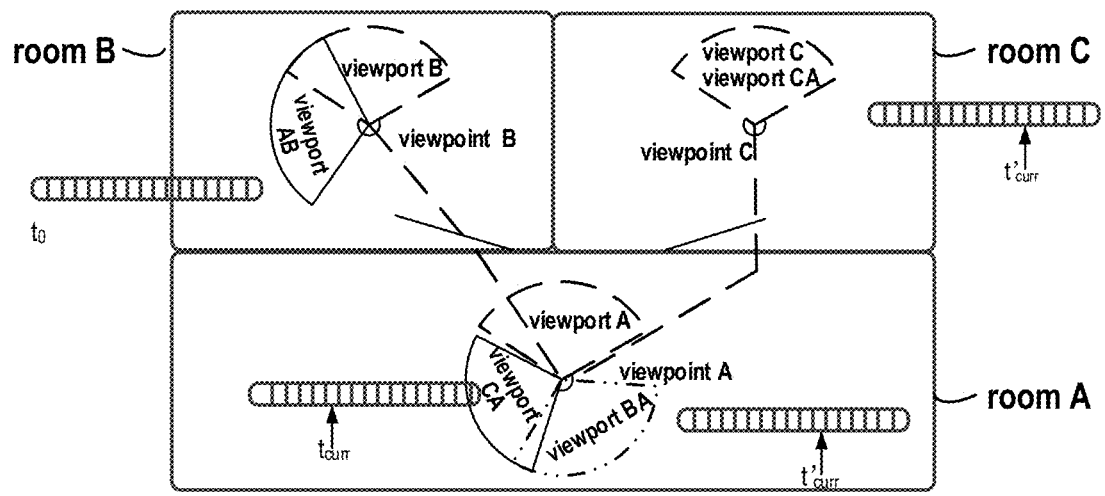
FIG. 6 schematically illustrate an example of switching between viewpoints.

FIG. 6 schematically illustrates some embodiments of a VR360 application of the disclosure. In some embodiment of the disclosure, the VR360 application is typically an OMAF application. Thanks to the present disclosure, it is possible to describe the following storyline paths:

The OMAF application starts in room A with a recommended viewport A allowing the user to see doors of room B and C. The media associated to viewpoint A starts at $t_0$.

When the user enters room B from room A, the transitions to viewpoint B and its initial viewport gives the user a same point of view as if the user was walking through the door between room A and B. The media associated to viewpoint B also starts at its beginning ($t_0$).

When the user enters room C from room A, the transitions to viewpoint C and its initial viewport gives the user a same point of view as if the user was walking through the door between room A and C. The media associated to viewpoint C also starts at its beginning ($t_0$).

When the user moves back to room A from room B, the transitions back to viewpoint A and its initial viewport gives the user the same point of view as if the user was walking through the door between room A and B. At that time, the media associated to viewpoint A continues from current time in the media timeline ($t_{curr}$).

When the user moves back to room A from room C, the transitions back to viewpoint A and its initial viewport gives the user a same point of view as if the user was walking through the door between room A and C. At that time, the media associated to viewpoint A continues from current time in the media timeline ($t'_{curr}$).

Please note that as in reality, depending which room the user is coming from, the initial point of view (viewport) of the user is actually different whether the user comes from room B or C.

The present disclosure offers at least one of the following advantages:

At any point in time, viewpoint switching capabilities from the current viewpoint are easily accessible to the OMAF player thanks to a unique ISOBMFF box associated to the viewpoint.

Many transition effects may be supported, including playing a (short) video that may either be embedded in the same OMAF application file and referred to thanks to its track_id or be available at a remote location referred to thanks to a URL.

When switching to the destination viewpoint, the playout of the new media may start with an offset either absolute or relative to the current playtime of the source viewpoint media.

When switching to the destination viewpoint, it is possible to specify a specific viewport to be used. This allows for instance, to switch to the same viewpoint but with different viewports for different source viewpoints. Please referring to the example shown in FIG. 6.

For any viewpoint switching signaled, it is also possible to define a single activation window. For multiple activation windows, the present disclosure also defines a way to signal it in the dynamic viewpoint information metadata track.

Figure 7:
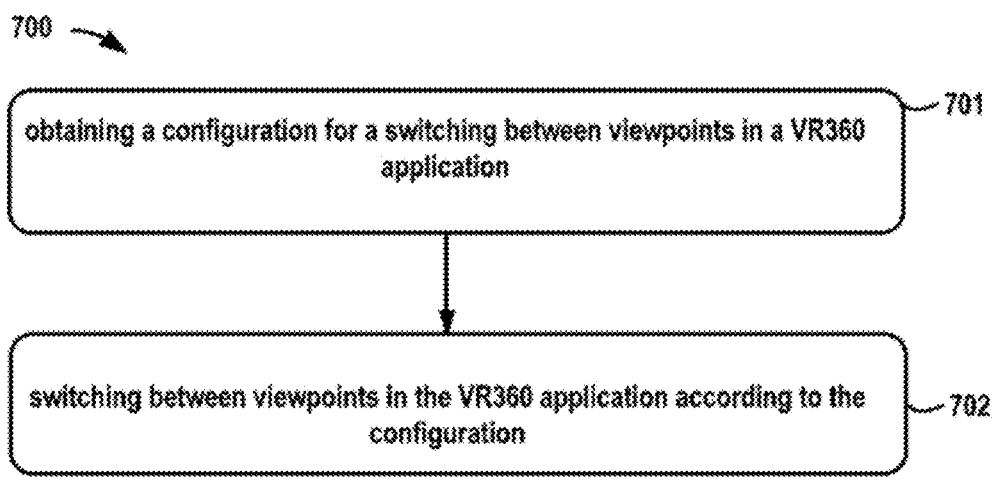
FIG. 7 schematically illustrates a flow chart of a method 700 according to embodiments of the present disclosure.

FIG. 7 illustrates a flow chart of a method 700 according to embodiments of the present disclosure. The method 700 may be implemented by a VR360 player, or an OMAF player, or some device like.

At 701, obtaining a configuration for a switching between viewpoints in a VR360 application; and At 702, switching between viewpoints in the VR360 application according to the configuration.

Referring to FIG. 3A to FIG. 6, the embodiments of the switching transition in method 700 is same as the embodiments shown in FIG. 3A to FIG. 6.

Figure 8:
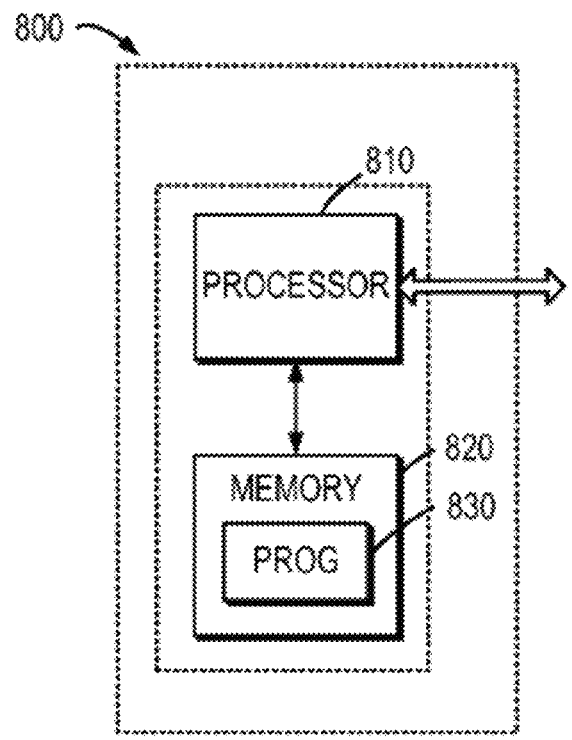
FIG. 8 is a simplified block diagram of a device 800 that is suitable for implementing embodiments of the present disclosure.

FIG. 8 is a simplified block diagram of a device 800 that is suitable for implementing embodiments of the present disclosure. As shown, the device 800 includes one or more processors 810, one or more memories 820 coupled to the processor(s) 810. The device 800 may be implemented as device for producing a VR360 application.

In some embodiment of the disclosure, the processor 810 is configured to execute the instructions to:
  determine a configuration for switching between viewpoints in a VR360 application; and
  signal the configuration to the VR360 application.

Referring FIG. 3A to FIG. 6, the embodiments of the switching transition device 800 implemented is same as the embodiments shown in FIG. 3A to FIG. 6.

The processor 810 may be of any type suitable to produce a VR360 application, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may be of any type suitable to store the VR360 application and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 820 stores at least a part of a program 830. The program 830 is assumed to include program instructions that, when executed by the associated processor 810, enable the device 800 to operate in accordance with the embodiments of the present disclosure, as discussed herein with reference to FIG. 2 to FIG. 6. That is, embodiments of the present disclosure can be implemented by computer software executable by the processor 810 of the device 800, or by hardware, or by a combination of software and hardware.

Figure 9:
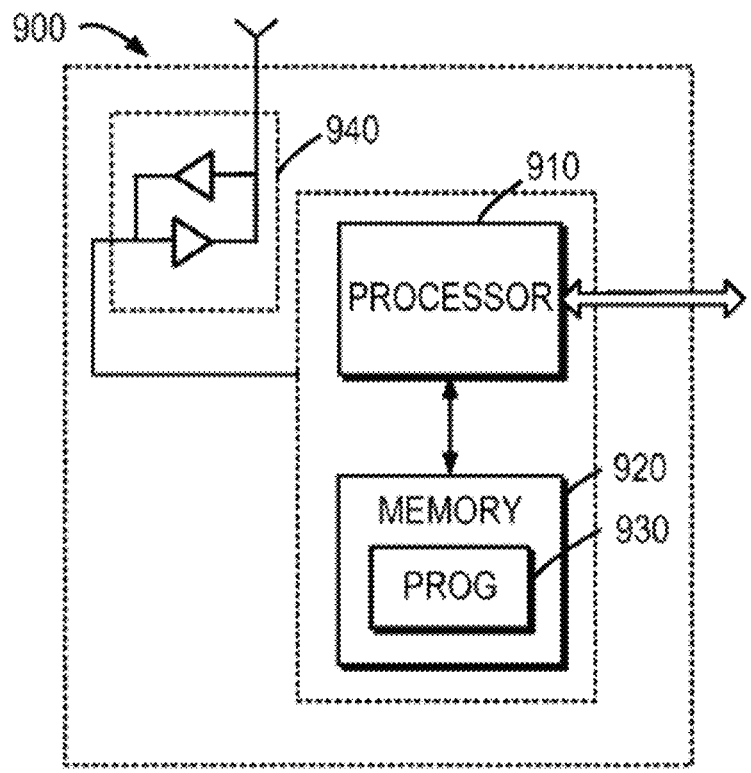
FIG. 9 is a simplified block diagram of a device 900 that is suitable for implementing embodiments of the present disclosure.

FIG. 9 is a simplified block diagram of a device 900 that is suitable for implementing embodiments of the present disclosure. As shown, the device 900 includes one or more processors 910, one or more memories 920 coupled to the processor(s) 910. The device 900 may be implemented as a VR360 player.

In some embodiment of the disclosure, the processor 910 is configured to execute the instructions to:
  obtain a configuration for switching between viewpoints in a VR360 application; and
  switch between viewpoints in the VR360 application according to the configuration.

Referring to FIG. 3A to FIG. 6, the embodiments of the switching transition device 900 implemented is same as the embodiments shown in FIG. 3A to FIG. 6.

In some embodiments, the device 900 may further include one or more transmitters and/or receivers (TX/RX) 940 coupled to the processor 910. In some embodiments, the transmitters and/or receivers (TX/RX) 940 are configured to locate the device 900.

The processor 910 may be of any type processor suitable to play a VR360 application, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

The memory 920 may be of any type suitable to store the VR360 application and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 920 stores at least a part of a program 930. The program 930 is assumed to include program instructions that, when executed by the associated processor 910, enable the device 900 to operate in accordance with the embodiments of the present disclosure, as discussed herein with reference to FIG. 7. That is, embodiments of the present disclosure can be implemented by computer software executable by the processor 910 of the device 900, or by hardware, or by a combination of software and hardware.

Figure 10:
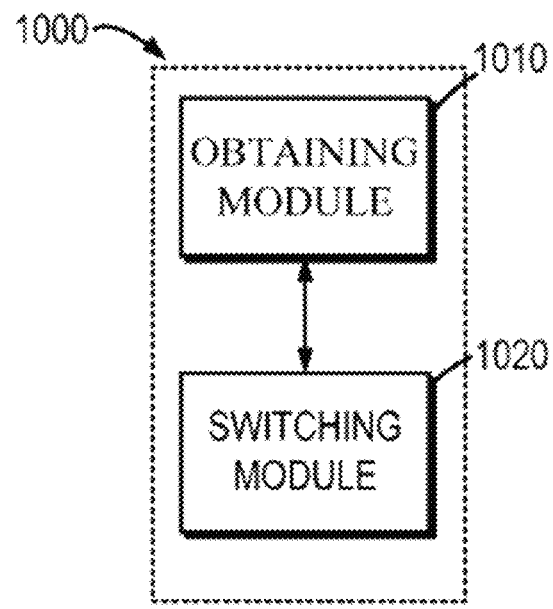
FIG. 10 is a simplified block diagram of a device 1000 that is suitable for implementing embodiments of the present disclosure.

FIG. 10 is a simplified block diagram of a device 1000 that is suitable for implementing embodiments of the present disclosure. The device 1000 may be implemented by a VR360 player. As shown, the device 1000 includes:

- an obtaining module 1010, configured to obtain a configuration for switching between viewpoints in a VR360 application; and
- a switching module 1020, configured to perform switching between viewpoints in the a VR360 application according to the configuration.

In some embodiments, the configuration comprises any or any combination of parameters:

- a viewport parameter indicating an initial viewport for a specific viewpoint switching,
- a transition effect parameter indicating a specific transition effect for a specific viewpoint switching,
- an activation window parameter indicating at least one activation window for a viewpoint switching, and
- a time switching parameter indicating a start position of playout in the destination media time during a specific viewpoint switching.

Referring to FIG. 3A to FIG. 6, the embodiments of the switching transition device 1000 implemented is same as the embodiments shown in FIG. 3A to FIG. 6.

Figure 11:
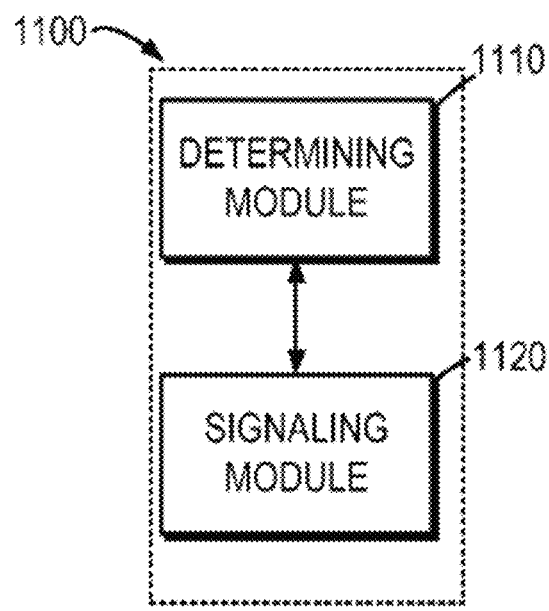
FIG. 11 is a simplified block diagram of a device 1100 that is suitable for implementing embodiments of the present disclosure.

FIG. 11 is a simplified block diagram of a device 1100 that is suitable for implementing embodiments of the present disclosure. The device 1100 may be implemented as a VR360 producer. As shown, the device 1100 includes:

- a determining module 1110, configured to determine a configuration for switching between viewpoints in a VR360 application; and
- a signaling module 1120, configured to signal the configuration to the VR360 application.

In some embodiments, the configuration comprises any or any combination of parameters:

- a viewport parameter indicating an initial viewport for a specific viewpoint switching,
- a transition effect parameter indicating a specific transition effect for a specific viewpoint switching,
- an activation window parameter indicating at least one activation window for a viewpoint switching, and
- a time switching parameter indicating a start position of playout in the destination media time during a specific viewpoint switching.

Referring to FIG. 3A to FIG. 6, the embodiments of the switching transition device 1100 implemented is same as the embodiments shown in FIG. 3A to FIG. 6.

The various blocks shown in FIG. 2 and FIG. 7 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in a device that is embodied as an integrated circuit, FPGA or ASIC that is configurable to operate in accordance with the exemplary embodiments of the present disclosure.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

In some embodiments of the disclosure, the VR360 media may be an OMAF media. In some embodiments of the disclosure, the VR360 player may be an OMAF player.

Based on the above description, the person skilled in the art would appreciate that the present disclosure may be embodied in a device, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, device, systems, techniques or methods described herein may be implemented in, as non-limiting examples, hardware, software, firmware, special purpose circuits or logic, general purpose hardware or controller or other computing devices, or some combination thereof.

Based on the above description, the skilled in the art would appreciate that the present disclosure may be embodied in a device, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, device, systems, techniques or methods described herein may be implemented in, as non-limiting examples, hardware, software, firmware, special purpose circuits or logic, general purpose hardware or controller or other computing devices, or some combination thereof.

While this specification contains many specific implementation details, these should not be construed as limitations on the scope of any disclosure or of what may be claimed, but rather as descriptions of features that may be specific to particular embodiments of particular disclosures.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method for transmitting viewpoint switching capabilities in a Virtual Reality 360 (VR360) application, comprising:
   determining a configuration for switching between viewpoints in the VR360 application; and
   signaling the configuration for switching between viewpoints to the VR360 application;
   the configuration comprising:
      a viewport parameter indicating an initial viewport for a specific viewpoint switching;
      a transition effect parameter indicating a specific transition effect for a specific viewpoint switching,
      a time switching parameter indicating a start position of playout in a destination media time during a specific viewpoint switching; and
      an activation window parameter indicating at least one activation window for the viewpoint switching;
      wherein the initial viewports corresponding to different viewpoint switching transitions from different source viewpoints to a same destination viewpoint are different;
   wherein the transition effect parameter comprises:
      a transition effect flag indicating whether a transition effect is present,
      a transition effect type flag indicating the type of transition effect for a specific switching, and
      a transition effect indicator indicating the position where a specific transition effect video is stored;
   wherein the time switching parameter comprises:
      a timeline-switching-offset flag indicating whether a time offset is present,
      an offset indicator indicating the value of the time offset, and
      a relative-to-current flag indicating information about starting point from which the offset is provided;
   wherein the activation window parameter comprises:
      a minimum time flag indicating whether a minimum time for a switching transition is present; wherein the transition is configured to be activated only after the minimum time upon determining that the minimum time is present,
      a minimum time parameter indicating value of the minimum time,
      a maximum time flag indicating whether a maximum time for a switching transition is present; wherein the transition is configured to be activated only before the maximum time when the maximum time is present, and
      a maximum time parameter indicating value of the maximum time.

2. The method of claim 1, wherein the configuration is an ISO Base Media File Format (ISOBMFF) box attached to a viewport or a switching transition.

3. The method of claim 1, wherein the viewport parameter comprises:
   a viewport flag indicating whether the initial viewport for a destination viewpoint is present.

4. The method of claim 1, the configuration further comprises a switching possibility parameter indicating multiple switching possibilities for a specific viewpoint, each switching possibility comprises at most one viewpoint that is indicated by a viewpoint parameter, and the switching possibility parameter comprises at least one of following parameters:
   a number parameter indicating the number of possible viewpoint switching, or
   an ID parameter indicating ID of a destination viewpoint of a viewpoint switching.

5. The method of claim 1, wherein the activation window parameter is attached in a time metadata track of a playout timeline.

6. A method for transmitting viewpoint switching capabilities in a Virtual Reality 360 (VR360) application, comprising:
   obtaining a configuration for switching between viewpoints in the VR360 application; and
   switching between viewpoints in the VR360 application according to the configuration;
   the configuration comprising:
      a viewport parameter indicating an initial viewport for a specific viewpoint switching;
      a transition effect parameter indicating a specific transition effect for a specific viewpoint switching,
      a time switching parameter indicating a start position of playout in a destination media time during a specific viewpoint switching; and
      an activation window parameter indicating at least one activation window for the viewpoint switching;

wherein the initial viewports corresponding to different viewpoint switching transitions from different source viewpoints to a same destination viewpoint are different;
wherein the transition effect parameter comprises:
a transition effect flag indicating whether a transition effect is present,
a transition effect type flag indicating the type of transition effect for a specific switching, and
a transition effect indicator indicating the position where a specific transition effect video is stored;
wherein the time switching parameter comprises:
a timeline-switching-offset flag indicating whether a time offset is present,
an offset indicator indicating the value of the time offset, and
a relative-to-current flag indicating information about starting point from which the offset is provided;
wherein the activation window parameter comprises:
a minimum time flag indicating whether a minimum time for a switching transition is present; wherein the transition is configured to be activated only after the minimum time upon determining that the minimum time is present,
a minimum time parameter indicating value of the minimum time,
a maximum time flag indicating whether a maximum time for a switching transition is present; wherein the transition is configured to be activated only before the maximum time when the maximum time is present, and
a maximum time parameter indicating value of the maximum time.

7. The method of claim 6, wherein the configuration is an ISO Base Media File Format (ISOBMFF) box attached to a viewport or a switching transition.

8. The method of claim 6, wherein the viewport parameter comprises:
a viewport flag indicating whether the initial viewport for the destination viewpoint is present.

9. The method of claim 6, wherein the configuration further comprises multiple switching possibilities with at most one viewport parameter per switching possibility, and the viewport parameter comprises at least one of following parameters:
a number parameter indicating the number of possible viewpoint switching, or
an ID parameter indicating ID of a destination viewpoint of a viewpoint switching.

10. The method of claim 6, wherein the activation window parameter is attached in a time metadata track of a playout timeline.

11. A device for transmitting viewpoint switching capabilities in a Virtual Reality 360 (VR360) application, comprising at least one memory, and at least one processor configured to execute the instructions to:
determine a configuration for switching between viewpoints in the VR360 application; and
signal the configuration to the VR360 application;
the configuration comprising:
a viewport parameter indicating an initial viewport for a specific viewpoint switching;
a transition effect parameter indicating a specific transition effect for a specific viewpoint switching,
a time switching parameter indicating a start position of playout in a destination media time during a specific viewpoint switching; and
an activation window parameter indicating at least one activation window for the viewpoint switching;
wherein the initial viewports corresponding to different viewpoint switching transitions from different source viewpoints to a same destination viewpoint are different;
wherein the transition effect parameter comprises:
a transition effect flag indicating whether a transition effect is present,
a transition effect type flag indicating the type of transition effect for a specific switching, and
a transition effect indicator indicating the position where a specific transition effect video is stored;
wherein the time switching parameter comprises:
a timeline-switching-offset flag indicating whether a time offset is present,
an offset indicator indicating the value of the time offset, and
a relative-to-current flag indicating information about starting point from which the offset is provided;
wherein the activation window parameter comprises:
a minimum time flag indicating whether a minimum time for a switching transition is present; wherein the transition is configured to be activated only after the minimum time upon determining that the minimum time is present,
a minimum time parameter indicating value of the minimum time,
a maximum time flag indicating whether a maximum time for a switching transition is present; wherein the transition is configured to be activated only before the maximum time when the maximum time is present, and
a maximum time parameter indicating value of the maximum time.

12. A device for transmitting viewpoint switching capabilities in a Virtual Reality 360 (VR360) application, comprising at least one memory, and at least one processor configured to execute the instruction to:
obtain a configuration for switching between viewpoints in the VR360 application; and
switch between viewpoints in the VR360 application according to the configuration;
the configuration comprising:
a viewport parameter indicating an initial viewport for a specific viewpoint switching;
a transition effect parameter indicating a specific transition effect for a specific viewpoint switching,
a time switching parameter indicating a start position of playout in a destination media time during a specific viewpoint switching; and
an activation window parameter indicating at least one activation window for the viewpoint switching;
wherein the initial viewports corresponding to different viewpoint switching transitions from different source viewpoints to a same destination viewpoint are different;
wherein the transition effect parameter comprises:
a transition effect flag indicating whether a transition effect is present,
a transition effect type flag indicating the type of transition effect for a specific switching, and
a transition effect indicator indicating the position where a specific transition effect video is stored;
wherein the time switching parameter comprises:
a timeline-switching-offset flag indicating whether a time offset is present, an offset indicator indicating the value of the time offset, and
a relative-to-current flag indicating information about starting point from which the offset is provided;
wherein the activation window parameter comprises:
a minimum time flag indicating whether a minimum time for a switching transition is present; wherein the transition is configured to be activated only after the minimum time upon determining that the minimum time is present,
a minimum time parameter indicating value of the minimum time,
a maximum time flag indicating whether a maximum time for a switching transition is present; wherein the transition is configured to be activated only before the maximum time when the maximum time is present, and
a maximum time parameter indicating value of the maximum time.

* * * * *